United States Patent

[11] 3,601,733

| [72] | Inventor | Edward Kazmarek<br>Reseda, Calif. |
|---|---|---|
| [21] | Appl. No. | 858,807 |
| [22] | Filed | Sept. 17, 1969 |
| [45] | Patented | Aug. 24, 1971 |
| [73] | Assignee | Lear Siegler, Inc.<br>Santa Monica, Calif. |

[54] AIRCRAFT CONTROL WHEEL FORCE SENSOR
18 Claims, 2 Drawing Figs.

[52] U.S. Cl. ................................. 336/30,
74/471, 244/83
[51] Int. Cl. ................................. H01f 21/02
[50] Field of Search ................................. 336/30;
74/471; 244/83; 318/286; 310/49, 24, 34

[56] References Cited
UNITED STATES PATENTS

| 3,493,906 | 2/1970 | Fetterberg .................. | 336/30 |
| 3,122,970 | 3/1964 | Rhoades ..................... | 90/62 |
| 3,013,189 | 12/1961 | Bernier ...................... | 317/173 |
| 3,454,854 | 7/1969 | Booth ........................ | 318/18 |
| 3,434,342 | 3/1969 | Kazmarek ................... | 73/133 |
| 3,153,229 | 10/1964 | Roberts ...................... | 340/347 |

Primary Examiner—Milton O. Hirshfield
Assistant Examiner—B. A. Reynolds
Attorney—Christie, Parker and Hale ABSTRACT: A control wheel force sensor has an inner member, an outer member and a middle member disposed in alignment along a reference axis. A spring that is flexible in a rotational direction about the reference axis and rigid in a translation direction parallel to the reference axis couples the middle member to one of the other members, a cylindrical bellows aligned with the axis couples the middle member to the remaining member. The bellows is flexible in a translational direction parallel to the reference axis and rigid in a rotational direction about the reference axis. The bellows supports the remaining member in spaced relationship from the middle member, and the other spring supports the middle member in spaced relationship from the one member.

PRIOR ART

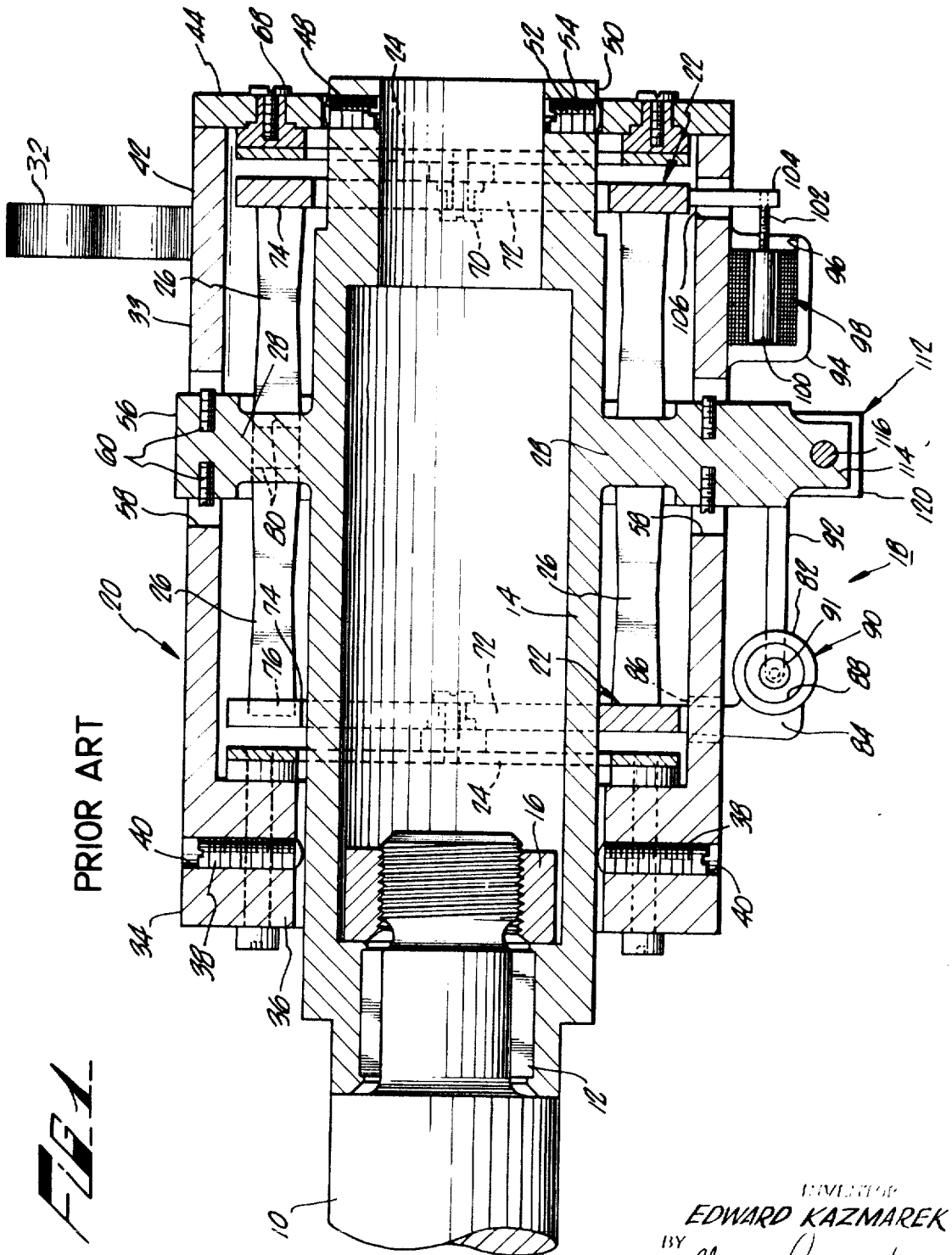

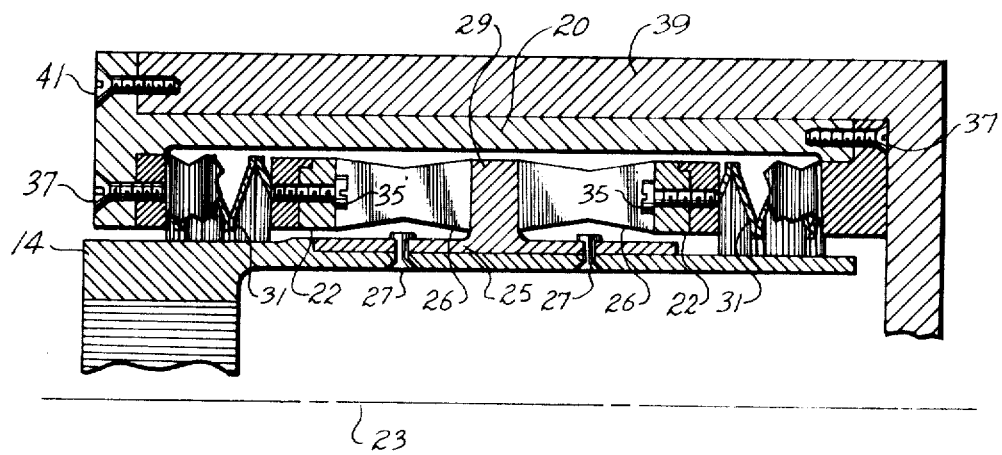

AIRCRAFT CONTROL WHEEL FORCE SENSOR

CROSS REFERENCE TO RELATED APPLICATIONS

The invention in this application is an improvement of the control wheel force sensor disclosed in Niklas K. F. Zetterberg, U.S. Pat. No. 3,493,906, issued on Feb. 3,1970, and assigned to the assignee of the present application, the disclosure of which is incorporated herein by reference.

BACKGROUND OF THE INVENTION

This invention relates to pilot control of an aircraft and, more particularly, to an improved control wheel force sensor.

The cross referenced patent discloses a control wheel force sensor that generates pitch and roll command signals responsive to forces applied to the control wheel by the pilot of an aircraft. An outer member, a middle member, and an inner member are all aligned about a reference axis of the aircraft-steering column. The outer member is fixed to the control wheel, and the inner member is fixed to a steering column shaft coaxial with the reference axis. Elastic, normally planar diaphragms that are deflectable in a translational direction parallel to the reference axis and rigid in a rotational direction about the reference axis connect the outer member to the middle member. Elastic beams that are deflectable in a rotational direction about the reference axis and rigid in a translational direction parallel to the reference axis connect the middle member to the inner member. The pitch command signal is generated by a transducer that senses the translational displacement of the outer member with respect to the steering column shaft, and the roll command signal is produced by a transducer that senses the rotational displacement of the middle member with respect to the inner member. In generating the command signals with the described arrangement, a marked improvement in isolation between the pitch and roll inputs is achieved.

The pilot commonly applies more translational force to one handle of the control wheel than to the other handle while he is introducing a pitch command. In such case, a torque is developed about an axis perpendicular to the reference axis of the steering column. The lateral stiffness of the diaphragms is too small to resist this torque satisfactorily, so extraneous movement between the outer and inner members can occur. The only relative movement that is wanted is pure translation parallel to the reference axis or pure rotation about the reference axis. Extraneous movement is taken in this specification to mean unwanted movement, i.e., relative movement other than translation parallel to or rotation about the reference axis. To maintain isolation between inputs and to prevent permanent deformation of the diaphragms, it has been found necessary to limit this extraneous movement with adjustable bearing sleeves between the outer and inner members. The bearing sleeves are finely adjusted to hold a slip fit between the outer and inner members and thus prevent appreciable relative movement therebetween other than translation parallel to and rotation about the reference axis. The adjustable bearing sleeves substantially increase the fabricating costs of the control wheel force sensor and require careful adjustment prior to use. Furthermore, as the diaphragms are deflected into a nonplanar shape, their spring characteristics change. The displacement of the diaphragm is a nonlinear function of the force exerted on it parallel to the reference axis. Therefore, the pitch command signal is not truly representative of the force applied to the control wheel in a translational direction. In addition, the lateral stiffness of the diaphragm is also a function of the deflection along the reference axis. Therefore, the isolation between the pitch and roll inputs can vary with the applied force.

SUMMARY OF THE INVENTION

The invention contemplates a control wheel force sensor in which a cylindrical bellows, aligned with the reference axis, is used as a spring in the translational direction parallel to a reference axis, instead of a diaphragm. The bellows has a higher lateral stiffness than a simple diaphragm. The outer, middle, and inner members are supported in spaced relationship from each other by the bellows and by the spring for the rotational direction without danger of any extraneous movement between the outer and inner members. Since the basic shape of a bellows does not change as it is deflected, its spring characteristics, translational and lateral, remain substantially constant throughout the entire range of operation of the control wheel force sensor. Further, the fabricating costs are substantially reduced because need of a bearing surface between the outer and inner members is eliminated.

Most advantageously, the middle member is split into two separate sections, one section being connected by one bellows to one end of the outer member and the other section being connected by another bellows to the other end of the outer member. The ends of the outer member are parallel and the ends of the bellows adjacent thereto are accordingly constrained to remain parallel to each other. This feature further enhances the lateral stiffness of the control wheel.

BRIEF DESCRIPTION OF THE DRAWINGS

The features of a specific embodiment of the best mode contemplated of carrying out the invention are illustrated in the drawings, in which:

FIG. 1 is a side elevation view in section of a prior art control wheel force sensor disclosed in U.S. Pat. No. 3,493,906, and FIG. 2 is a partial side elevation view of a control force sensor incorporating the improvement of the present invention.

DESCRIPTION OF THE SPECIFIC EMBODIMENT

The disclosure of the cross reference patent is incorporated herein by reference. In FIG. 1, which is the prior art as represented by the cross-referenced patent, a steering column shaft 10 is connected to an inner member 14. A middle member 22 is connected to inner member 14 by leaf springs 26. An outer member 20 is connected to middle member 22 by spring rings 24. A transducer 90 senses the relative rotational movement between inner member 14 and middle member 22, and a transducer 98 senses the relative translational movement between outer member 20 and middle member 22. Transducers 90 and 98 each comprise a differential transformer that produces an electrical signal proportional to the axial displacement between a center core (91, 100) and transformer winding surrounding the core. A control wheel 32 is formed integral with outer member 20.

In FIG. 2, the reference numerals are consistent with FIG. 1, the same reference numerals being used to identify like elements. Inner member 14, outer member 20, and middle member 22, are all aligned with a reference axis 23. Steering column shaft 10 (not shown in FIG. 2) is aligned with axis 23 and fixed to inner member 14 in the manner shown in FIG. 1. Inner member 14 has splines that mate with splines on the steering column shaft. Members 14, 20, and 22 are all annular. Middle member 22 is split into two separate sections. A cylindrical mounting bracket 25 is fixed to inner member 14 by rivets 27 or other fastening means. Bracket 25 has a centrally disposed, radial flange 29. A plurality of leaf springs 26 are disposed around inner member 14 in two annular banks. Springs 26 lie in radial planes that pass through reference axis 23. The inner end of each of springs 26 in one bank is fixed to one side of flange 29, and the inner end of each of springs 26 in the other bank is fixed to the other side of flange 29, as depicted in the drawing. The outer end of each of springs 26 is fixed to a section of middle member 22. Springs 26 deform elastically when a force is applied to middle member 22 in a rotational direction about reference axis 23, thereby permitting relative rotation between middle member 22 and inner member 14. In FIG. 2, bellows 31 are substituted for ring springs 24 between the sections of middle member 22 and opposite ends of outer member 20. One end of each of bellows 31 is fixed to a section of middle member 22 by a plurality of screws such as those represented at 35. The other end of each of bellows 31 is fixed to outer member 20 by a plurality of screws such as those represented at 37. Bellows 31 are cylindrical, aligned with axis 23, and sufficiently long relative to the axial distance between outer member 20 and middle member 22 so that they always remain compressed during the operation of the control wheel. A control wheel housing 39 encloses outer member 20 on all sides except the back, i.e., where the steering column shaft attaches to inner member 14. Housing 39 is fixed to outer member 20 by screws such as that represented at 41.

Springs 26 remain rigid with respect to forces applied in a translational direction parallel to reference axis 23. Thus, middle member 22 is not able to move relative to inner member 14 in a translational direction parallel to reference axis 23. Upon the application of a force to outer member 20 in a translational direction parallel to reference axis 23, bellows 31 deform to permit outer member 20 and housing 39 to translate relative to middle member 22 and inner member 14. The reactive force of bellows 31 is rigidly coupled by springs 26 to inner member 14. Bellows 31 remain rigid with respect to forces applied to them in a rotational direction about reference axis 23. Thus, a force applied to outer member 20 in a rotational direction about reference axis 23 is rigidly coupled to middle members 22, and causes middle member 22 to deflect springs 26.

It is to be noted that in FIG. 2 members 14, 20, and 22 are held in vertically spaced-apart, parallel relationship from each other by bellows 31 and springs 26. No bearing surfaces are required between the members to prevent extraneous movements because bellows 31 are constructed so they have a high, lateral stiffness. Furthermore, the fact that bellows 31 are constrained between two parallel surfaces, namely, outer member 20 and housing 39, further stiffens bellows 31 laterally.

Transducer 98 (not shown in FIG. 2) senses the displacement between outer member 20 and middle member 22 to generate a pitch command signal, and transducer (not shown in FIG. 2) senses the displacement between middle member 22 and inner member 14 to generate a roll command signal.

Although not shown in the drawing, the control wheel of this invention could include stop blocks 56 on the end of flange 29 and apertures 58 in outer member 20, as shown in the cross referenced patent.

What is claimed is:

1. A force sensor for independently sensing translational and rotational forces applied to a steering element relative to a reference axis of a mounting element, the sensor comprising:
an inner member disposed along the reference axis;
an outer member disposed about the inner member, one of the members being adapted to receive forces applied to the steering element;
a middle member movable relative to and disposed intermediate the inner and the outer members;
a cylindrical bellows that is elastically flexible in a translational direction parallel to the reference axis and rigid in a rotational direction about the reference axis, the bellows being aligned with the reference axis and coupled between the middle member and one of the other members;
means elastically flexible in a rotational direction about the reference axis and rigid in a translational direction parallel to the reference axis, the means being coupled between the middle member and the remaining member; and
means for independently sensing relative translational movements between the middle member and the one member and rotational movements between the middle member and the remaining member.

2. The force sensor of claim 1, in which the means elastically flexible in a rotational direction comprise a plurality of substantially flat, elongated, planar leaf springs that are radially disposed about the reference axis, each leaf spring being secured to the middle member and the remaining member.

3. The force sensor of claim 2, in which the bellows has high lateral stiffness and the inner, outer, and middle members are all supported in spaced apart relationship by the bellows and the leaf springs.

4. The force sensor of claim 1, in which the bellows has high lateral stiffness and the inner, outer, and middle members are all supported in spaced apart relationship by the bellows and the means elastically flexible in a rotational direction.

5. The force sensor of claim 1, in which the middle member has first and second separate sections, one end of the bellows is fixed to one end of the outer member, the other end of the bellows is fixed to one end of the first section of the middle member, the means elastically flexible in a rotational direction is coupled between the first section of the middle member and the inner member, and the force sensor additionally comprises an additional cylindrical bellows that is elastically flexible in a translational direction parallel to the reference axis and rigid in a rotational direction about the reference axis, the additional bellows being aligned with the reference axis, having one end fixed to the other end of the outer member and having the other end fixed to one end of the second section of the middle member, and additional means elastically flexible in a rotational direction about the reference axis and rigid in a translational direction parallel to the reference axis, the additional means being coupled between the other end of the second section of the middle member and the inner member, the outer member holding the ends of the two bellows fixed to it in parallel relationship to each other as the forces are applied to the steering element.

6. The force sensor of claim 5, in which the two means elastically flexible in a rotational direction are each a plurality of planar leaf springs disposed radially about the reference axis, and the inner member has a flange extending radially outward therefrom, one end of each leaf spring being fixed to the flange.

7. The force sensor of claim 6, in which the two bellows are laterally stiff and the two bellows and the leaf springs support the inner, outer, and middle members in spaced relationship from each other while forces are being applied to the steering element.

8. The force sensor of claim 7, in which the steering element is an aircraft control wheel fixed to the outer member.

9. The force sensor of claim 8, in which the bellows are sufficiently long to remain in compression during the full range of the relative translational movement between the middle member and the outer member.

10. The force sensor of claim 1, in which the bellows are sufficiently long to remain in compression during the full range of the relative translational movement between the middle member and the one member.

11. Apparatus for emitting signals responsive to translational and rotational forces applied to an aircraft control wheel, the apparatus comprising:
an elongated, cylindrical inner member disposed about a reference axis;
an elongated, cylindrical outer member coaxially disposed about the inner member;
a steering column secured to one of the members;
a control wheel secured to the other member;
an intermediate member coaxially disposed between the outer and inner members;
a coaxially disposed laterally stiff cylindrical bellows connected between the intermediate member and one of the other members, the bellows being deflectable in a translational direction parallel to the reference axis and being rigid in a rotational direction about the reference axis so as to absorb translational forces and transmit rotational forces;
a rotationally deflectable spring connected between the intermediate member and the remaining member, the spring being deflectable in a rotational direction about the reference axis and being rigid in a translational direction parallel to the reference axis so as to absorb rotational forces and transmit translational forces, the bellows and the rotationally deflectable spring holding the inner, intermediate, and outer members in parallel vertically spaced relationship from each other;

means for emitting an electrical signal indicative of the relative translational movement between the intermediate member and the one member; and means for emitting an electrical signal indicative of the relative rotational movement between the intermediate member and the remaining member.

12. The apparatus of claim 11, in which a flange is fixed to the inner member, the intermediate member has a first section disposed between the flange and one end of the outer member and a second section disposed between the flange and the other end of the outer member, the bellows is connected between the first section and one of the other members, an additional coaxially disposed cylindrical bellows is connected between the second section and the one other member, the additional bellows being deflectable in a translational direction parallel to the reference axis and being rigid in a rotational direction about the reference axis so as to absorb translational forces and to transmit rotational forces, the rotationally deflectable spring is connected between the first section and the remaining member, and an additional rotationally deflectable spring is connected between the second section and the remaining member, the additional spring being deflectable in a rotational direction about the reference axis and being rigid in a translational direction parallel to the reference axis so as to absorb rotational forces and to transmit translational forces.

13. The apparatus of claim 12, in which the two bellow are laterally rigid and the two bellows and the two springs support the inner member, the outer member, and the intermediate member in spaced apart relationship as forces are applied to the control wheel.

14. The apparatus of claim 13, in which the one member is the outer member and the remaining member is the inner member, one end of each bellows being connected to the outer member and the other end of each bellows being connected to one section of the intermediate member, one end of each rotationally deflectable spring being connected to the flange and the other end of each rotationally deflectable spring being connected to one section of the intermediate member.

15. The apparatus of claim 14, in which the ends of the two bellows are fixed to the outer member such that they are held in parallel relationship as forces are applied to the control wheel.

16. The apparatus of claim 15, in which the springs comprise two banks of planar leaf springs radially disposed about the reference axis.

17. The apparatus of claim 11, in which the bellows are sufficiently long to remain in compression during the full range of the relative translation between the intermediate member and the one member.

18. Apparatus for emitting signals responsive to translational and rotational forces applied to an aircraft control wheel, the apparatus comprising:

an elongated, cylindrical inner member disposed about a reference axis, the inner member having first and second oppositely disposed outer surfaces;

an elongated, cylindrical outer member coaxially disposed about the inner member, the outer member having first and second opposite parallel inner surfaces that respectively face the first and second outer surfaces of the inner member;

a steering column secured to one of the members;

a control wheel secured to the other member;

a first intermediate member coaxially disposed between the first surfaces of the outer and inner members;

a second intermediate member coaxially disposed between the second surfaces of the outer and inner members;

a first coaxially disposed cylindrical bellows connected between the first intermediate member and the first surface of the outer member;

a second coaxially disposed cylindrical bellows connected between the second intermediate member and the second surface of the outer member, the first and second bellows being deflectable in a translational direction parallel to the reference axis and being rigid in a rotational direction about the reference axis so as to absorb translational forces and transmit rotational forces;

a first rotationally deflectable spring connected between the first intermediate member and the first surface of the inner member;

a second rotationally deflectable spring connected between the second intermediate member and the second surface of the inner member, the first and second springs being deflectable in a rotational direction about the reference axis and being rigid in a translational direction parallel to the reference axis so as to absorb rotational forces and transmit translational forces; and means for emitting electrical signals representative of the relative translational movement between the intermediate members and the outer member and the relative rotational movement between the intermediate members and the inner member.